US010332146B2

(12) United States Patent
Chauhan

(10) Patent No.: US 10,332,146 B2
(45) Date of Patent: Jun. 25, 2019

(54) SYSTEMS AND METHODS FOR EVALUATING EFFECTIVENESS OF CAMPAIGNS THROUGH USE OF TRANSACTION AMOUNT MARKERS

(71) Applicant: MASTERCARD INTERNATIONAL INCORPORATED, Purchase, NY (US)

(72) Inventor: Rohit Chauhan, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 955 days.

(21) Appl. No.: 14/275,566

(22) Filed: May 12, 2014

(65) Prior Publication Data

US 2015/0324838 A1    Nov. 12, 2015

(51) Int. Cl.
G06Q 30/00    (2012.01)
G06Q 30/02    (2012.01)
(52) U.S. Cl.
CPC ..... *G06Q 30/0242* (2013.01); *G06Q 30/0246* (2013.01)
(58) Field of Classification Search
CPC .............. G06Q 30/02; G06Q 30/0255; G06Q 30/0224; G06Q 40/00
See application file for complete search history.

(56) References Cited

U.S. PATENT DOCUMENTS

| 2008/0167000 A1* | 7/2008 | Wentker | G06Q 20/10 455/408 |
| 2011/0106607 A1* | 5/2011 | Alfonso | G06Q 30/02 705/14.25 |
| 2016/0335653 A1* | 11/2016 | Bodington | G06Q 30/02 |

* cited by examiner

Primary Examiner — Alvin L Brown
(74) Attorney, Agent, or Firm — Harness, Dickey & Pierce, P.L.C.

(57) ABSTRACT

Systems and methods for evaluating effectiveness of campaigns are disclosed. One exemplary method includes identifying a promotional campaign offered by a merchant during an offer period including an offer of a commodity at a predetermined price, and compiling a first set of payment accounts based on each payment account including a transaction to the merchant at the predetermined price within the offer period. The method also includes correlating the first set of payment accounts to a second set of payment accounts based on at least one identifying criteria associated with transactions to the payment accounts during a correlation period, which is different than the offer period. The method further includes generating and storing a comparison between the first set of payment accounts and the second set of payment accounts for transaction data during the offer period, to thereby indicate an effectiveness of the campaign.

17 Claims, 5 Drawing Sheets

SYSTEMS AND METHODS FOR EVALUATING EFFECTIVENESS OF CAMPAIGNS THROUGH USE OF TRANSACTION AMOUNT MARKERS

FIELD

The present disclosure generally relates to systems and methods for evaluating effectiveness of campaigns, where the campaigns include offers for sale of commodities at predetermined prices, i.e., transaction amount markers, for offer periods.

BACKGROUND

This section provides background information related to the present disclosure which is not necessarily prior art.

Payment accounts are known to be used to purchase a variety of different goods and services, i.e., commodities, from merchants. Payment accounts are generally associated with credit cards, debit cards, prepaid cards, and other payment forms, which are used to post transactions to payment accounts. Entities involved in passing the transaction through the payment network often gather information related to the transaction. Separately, merchants and others are known to provide campaigns to promote sales. Campaigns generally last for a period of time, during which one or more commodities is offered for sale at discounted prices. Campaigns may be provided to increase sales of the discounted commodities, to increase consumer traffic at the merchants' sales sites (real and/or virtual), and/or to enhance consumer loyalty to the particular merchants and/or payment forms.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings.

Merchants are known to offer campaigns related to particular commodities (e.g., goods or services, etc.). The campaigns may be offered by the point of sale merchants, or supplier or manufacturers of the products (broadly, merchants). The effectiveness of the campaigns to further one or more goals of the merchants is not readily apparent from merely tracking sales of the commodities, which are dis- counted as part of the campaigns. Systems and methods are described herein for use in evaluating the effectiveness of campaigns. In particular, historical transaction behavior for consumers' participating in the campaigns is used to identify control groups of consumers not participating in the campaigns, who are similar to the participating groups in one or more ways. By then comparing transaction data from the participating groups and the control groups, which is posted during and/or after an offer period, an effectiveness of the campaigns may be evaluated.

Figure 1:
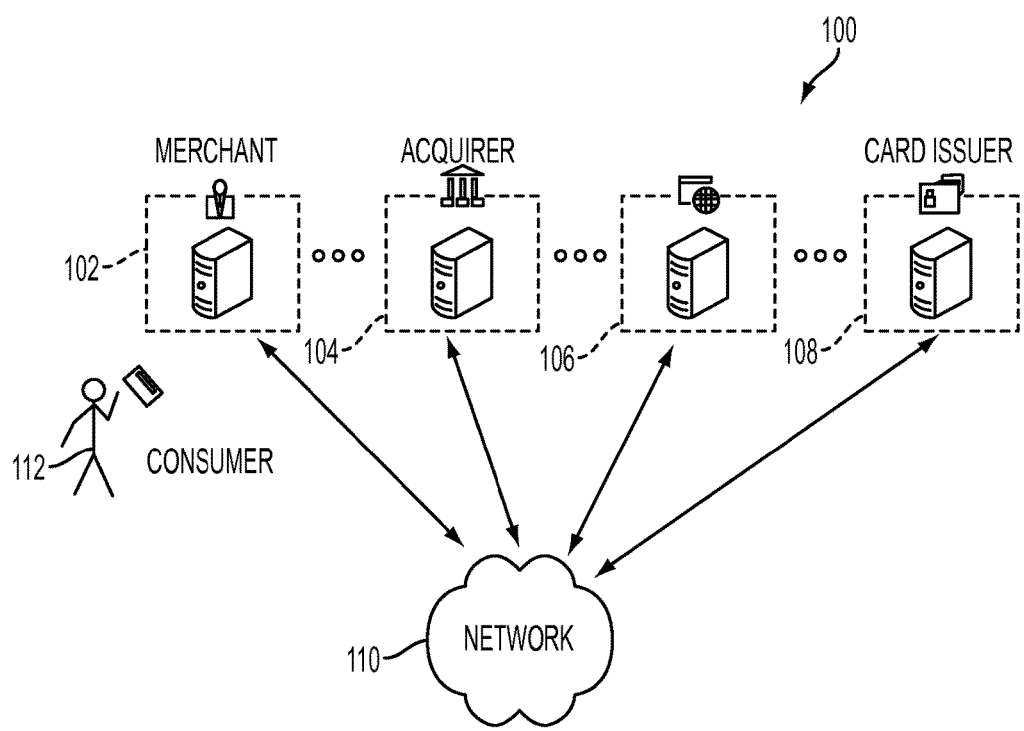
FIG. 1 is a block diagram of an exemplary system of the present disclosure suitable for use in evaluating effectiveness of a campaign.

FIG. 1 illustrates an exemplary system 100, in which the one or more aspects of the present disclosure may be implemented. Although, in the described embodiment, components of the system 100 are presented in one arrangement, other embodiments may include the same or different components arranged otherwise, depending, for example, on certain processes for payment transactions, etc.

Referring to FIG. 1, the system 100 generally includes a merchant 102, an acquirer 104 (or merchant bank), a payment service provider 106, and an issuer 108, each coupled to network 110. The network 110 may include, without limitation, a local area network (LAN), a wide area network (WAN) (e.g., the Internet, etc.), a mobile network, and/or another suitable public and/or private network capable of supporting communication among two or more of the components illustrated in FIG. 1, or even combinations thereof. Generally, in this example, at least two networks are included in the network 110. A public network is coupled between the merchant 102 and the acquirer 104, while a private payment network is coupled between the acquirer 104, the payment service provider 106, and the issuer 108.

Each of the merchant 102, the acquirer 104, the payment service provider 106, and the issuer 108 in the illustrated system 100 may be implemented in any one or more computing devices, such as a computing device or multiple computing devices located together, or distributed across a geographic region. For illustration, the system 100 is further described below with reference to an exemplary computing device 200 illustrated in FIG. 2. The system 100, and the components therein, however, should not be considered to be limited to the computing device 200, as different computing devices, and/or arrangements of computing devices may be used in other embodiments.

The computing device 200 may include, for example, one or more servers, workstations, personal computers, laptops, tablets, PDAs, point of sale terminals, smartphones, etc.

Figure 2:
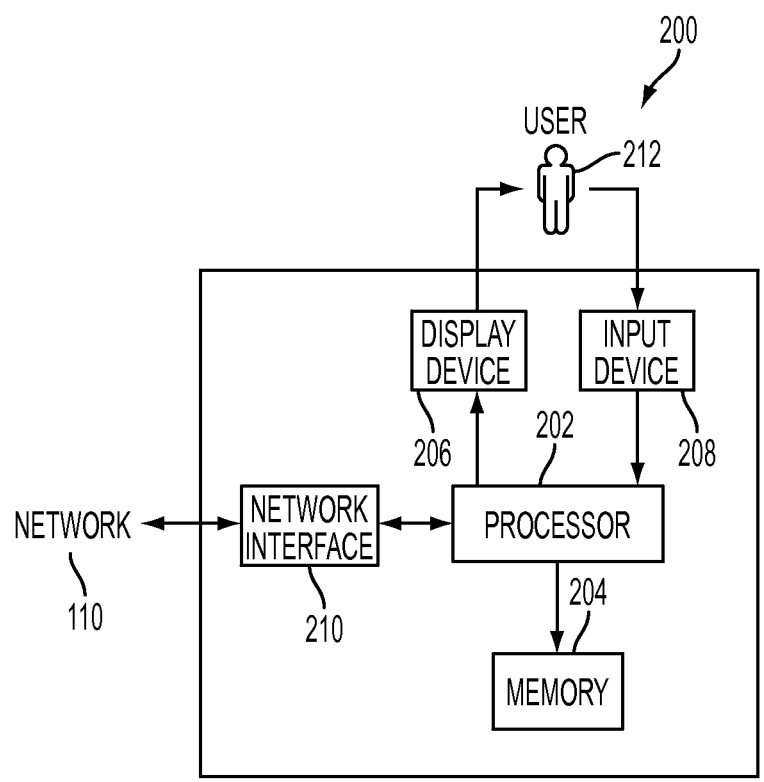
FIG. 2 is a block diagram of a computing device that may be used in the exemplary system of FIG. 1.

As shown in FIG. 2, the exemplary computing device 200 includes a processor 202 and a memory 204 coupled to the processor 202. The processor 202 may include, without limitation, a central processing unit (CPU), a microprocessor, a microcontroller, a programmable gate array, an ASIC, a logic device, or the like. The memory 204 is a computer readable media, which includes, without limitation, random access memory (RAM), a solid state disk, a hard disk, compact disc read only memory (CD-ROM), erasable programmable read only memory (EPROM), tape, flash drive, and/or any other type of volatile or nonvolatile physical or tangible computer-readable media. Memory 204 may be configured to store, without limitation, transaction data, consumer information, merchant information, identifying criteria, campaign information (e.g., predetermined discount prices, offer periods, etc.), comparison reports, and/or other types of data suitable for use as described herein.

In the exemplary embodiment, computing device 200 includes a display device 206 that is coupled to the processor 202. Display device 206 outputs to a user 212 by, for example, displaying and/or otherwise outputting information such as, but not limited to, reports, payment account information, payment transactions, and/or any other type of data. For example, display device 206 may include, without limitation, a cathode ray tube (CRT), a liquid crystal display (LCD), a light-emitting diode (LED) display, an organic LED (OLED) display, and/or an "electronic ink" display. In some embodiments, display device 206 includes multiple devices. It should be further appreciated that various interfaces (e.g., graphic user interfaces (GUI), or webpages, etc.) may be displayed at computing device 200, and in particular at display device 206, to initiate, solicit, complete, and/or compare payment transactions, etc.

The computing device 200 also includes an input device 208 that receives input from the user 212, such as at the merchant 102, for example. The input device 208 is coupled to the processor 202 and may include, for example, a keyboard, a point device, a mouse, a stylus, a touch sensitive panel (e.g., a touch pad or a touch screen, etc.), and/or an audio input device. In some example embodiments, the input device 208 may include a card reader, swipe reader, etc., and/or any other device suitable for obtaining payment transaction information from a payment device. Further, in various exemplary embodiments, a touch screen, such as that included in a tablet, a smartphone, or similar device, behaves as both a display device 206 and input device 208.

The computing device 200 further includes a network interface 210 coupled to the processor 202. The network interface 210 may include, without limitation, a wired network adapter, a wireless network adapter, a mobile telecommunications adapter, or other device capable of communicating to one or more different networks, including the network 110.

Referring again to FIG. 1, the merchant 102, the acquirer 104, the payment service provider 106, and the issuer 108 cooperate, in response to a request from a consumer 112, to complete a payment transaction.

As an example, in a credit transaction in the system 100, the merchant 102 reads a payment device (e.g., MasterCard® payment devices, etc.) and transmits an authorization request (including an account number and an amount of the purchase) to the acquirer 104. The acquirer 104, in turn, communicates with the issuer 108 through the payment service provider 106, such as, for example, the MasterCard® interchange, for authorization to complete the transaction. If the issuer 108 accepts the transaction, an authorization reply is provided back to the merchant 102 and the merchant 102 completes the transaction. The transaction is posted to the payment account associated with the consumer 112. The transaction is later settled by and between the merchant 102, the acquirer 104, and the issuer 108. In other exemplary transactions, a transaction may further include the use of a personal identification number (PIN) authorization, or other steps associated with identifying a payment account and/or authenticating the consumer 112, etc.

Transaction data is generated, collected, and stored as part of the above interactions among the merchant 102, the acquirer 104, the payment service provider 106, the issuer 108, and the consumer 112. The transaction data includes the transactions to one or more payment accounts, which include without limitation, payment account numbers, ticket size, merchant identification (ID), merchant category code (MCC), etc., which is present in the payment network to authorize transactions between multiple merchants 102 and multiple issuers 108. Transaction data may further include other product specific information, such as price per commodity, or commodity identifiers, etc. It should be appreciated that still other transaction data related to transactions, products, consumers and/or merchants may further be collected, stored, and/or transmitted within the system 100.

Figure 3:
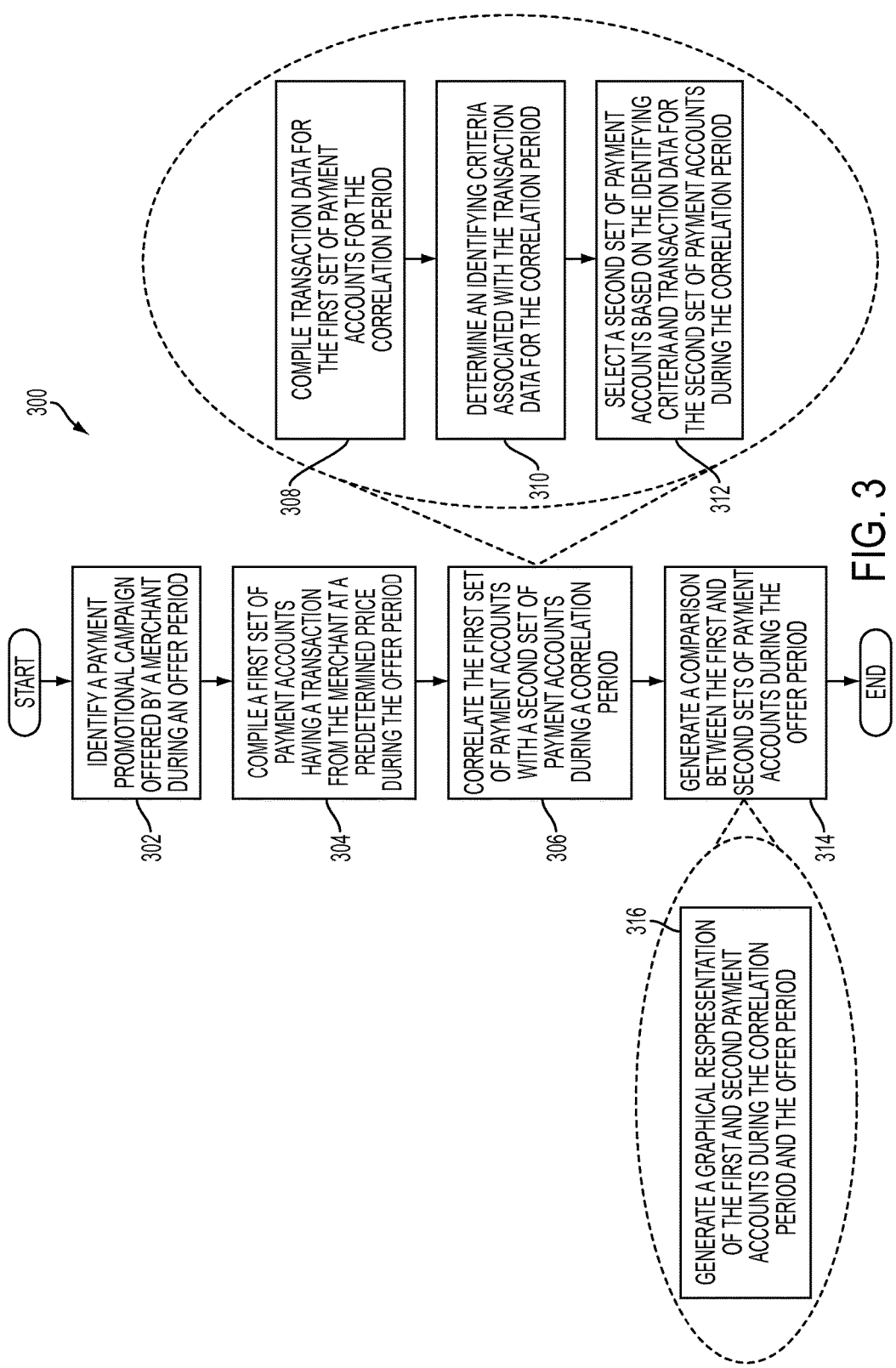
FIG. 3 is an exemplary method for evaluating effectiveness of a campaign.

FIG. 3 illustrates an exemplary method 300 of evaluating effectiveness of a campaign. For purposes of illustration, the exemplary method 300 is described as performed by the payment service provider 106, which includes one or more computing devices 200, as described above. It should be appreciated that the methods described herein are not limited to the system 100, or computing device 200. And, conversely, the systems and computing devices described herein are not limited to the exemplary method 300.

Method 300 is further described with reference to a campaign. The campaign may be offered by the merchant 102, and includes a commodity offered for sale at a predetermined price during an offer period. A campaign may vary depending on the particular merchant and/or the type of commodity associated with the campaign. In addition, campaign tracking can be done at a product/service level, a merchant level, a consumer level (e.g., a group of qualified consumers—based on segmentation, etc.), or at the payment network level (e.g., MasterCard® payment network level, etc.). In one example, MyAirWays merchant offers an inflight snack for $1.29 (i.e., a predetermined price), when the consumer uses a MasterCard® payment account to complete the purchase, where the regular price is $2.99. In another example, a campaign includes offering a music concert ticket for only $79 when the consumer uses a MasterCard® payment account to complete the purchase, where the regular price of the music concert ticket is $99. In at least one example, the campaign is not tied to use of any particular payment type, such that it is likely only a portion of transactions within the campaign will be made using a certain payment type. In such an example, the methods and systems described herein may not capture every transaction at the campaign's predetermined price, but will still capture sufficient transactions within the campaign to evaluate the effectiveness of the campaign.

It should be appreciated that a variety of different campaigns may be used, as described herein, where the campaigns include a predetermined price that is different than a regular price or otherwise identifiable as a marker. This predetermined price is often selected as a unique amount, so that it may be identified as described below. In particular the predetermined prices may be selected, in some embodiments, to reduce the probability of including payment accounts for consumers who did not actually participate in the campaign, but are instead purchasing other commodities that happen to have the same price. In at least one example, the merchant 102 reserves certain prices for use in conjunction with campaigns described herein, such that no commodity for purchase from the merchant is priced at that amount, unless as part of a campaign. In addition to the predetermined prices, transaction data may also (or alternatively) be compiled, such that it aids in the identification of transactions involved in the campaign. For example, transaction data may include an indication of a type or category of commodity purchased. Further, the offer period for the campaign may be for any suitable period of time, such as, for example, one month, three months, six months, one year, etc. The offer period is often selected by the merchant 102, or other entity associated with the campaign. Different campaigns may be offered at different times, or at the same time for different offer periods, for a variety of merchants. In at least one embodiment, the payment service provider 106 initiates the campaign, separate from or in conjunction with the merchant 102.

As shown in FIG. 3, the payment service provider 106 identifies a promotional campaign at 302, which is offered by merchant 102 (or other entity, alone or in conjunction with the merchant 102) during an offer period. After identifying the campaign, the payment service provider 106, and in particular, the processor 202, compiles a first set of payment accounts having a transaction to the merchant 102 at the predetermined price during the offer period, at 304. The predetermined price may be considered as a transaction amount marker. Using the above MyAirWays example, the payment service provider 106 compiles the first set of payment accounts based on the payment accounts having a transaction from the MyAirWays merchant for $1.29. By identifying the predetermined price in a transaction to the merchant 102, the payment service provider 106 determines which payment accounts participated in the campaign without requiring any additional information such as, for example, consumer registration with the merchant 102, etc. Any consumer having a transaction at the merchant 102 at the predetermined price may be considered as having participated in the campaign, and may be added to the first set of payment accounts (also referred to herein as a test group).

In some instances, consumers may wish to purchase multiple commodities involved in the campaign. As such, in some examples, the payment service provider 106 includes payment accounts in the first set, when the payment accounts have transaction amounts to the merchant 102 which are multiples of the predetermined price. Again, with reference to the MyAirWays example above, payment accounts with transactions of multiples of $1.29 (e.g., 2*$1.29=$2.58, 3*$1.29=$3.87, etc.) will also be included in the first set, because each is participating in the campaign.

Further, when multiple products/services are being bought under a single receipt, the total transaction amount of the receipt could be rendered as a marker. In such cases, for example, the transaction markers are assigned $xxx.x9. Qualifying transactions are given discounts, $0.01-$0.08 during the campaign period, in order to get the last digit of the total amount of the transactions to $xxx.x9 (e.g. a qualifying transaction of $10.01 is given a discount of $0.02 to get the transaction amount of $9.99 (transaction marker)). In addition, non-qualifying transactions that appear as markers ($xxx.x9) are also given a discount (during the campaign period) to make the transaction appear as a non-marked transaction (e.g., a non-qualifying total transaction value of $10.99 is given a discount of $0.01 to get final value of the transaction to $10.98 (not a marked transaction)).

As shown in FIG. 3, after compiling the first set at 304, the payment service provider 106 then correlates the first set of payment accounts with a second set of payment accounts, at 306. The second set of payment accounts, also referred to herein as a control group, may be a group of payment accounts that exhibit similar purchase behavior as the first set of payment accounts during a correlation period. The correlation period is often prior to the offer period, for example, a pre-campaign period, etc. The correlation period may be for example, one month, three months, six months, one year, or a different duration, etc. The correlation period generally does not have any overlap with, and is different from, the offer period but is generally a predefined period there before. The correlation period, for example, may occur completely before the start of the offer period. The correlation period may be the same length as the offer period, or may be a different length than the offer period. Further, the correlation period may be immediately prior to the start of the offer period (e.g., the correlation period lasts for six months immediately prior to the start of a campaign, etc.), or may be a different time period, spaced apart from the offer period.

Correlating the first and second sets of payment accounts optionally includes (indicated by the dotted lines in FIG. 3) compiling transaction data for the first set of payment accounts during the correlation period (e.g., the pre-campaign period, etc.), at 308. In particular, the processor 202 obtains transaction data for the first set of payment accounts, stored in memory 204 of the payment service provider 106, for the correlation period (e.g., the pre-campaign period, etc.). The payment service provider 106 then determines identifying criteria, at 310, associated with the first set of payment accounts during the correlation period (e.g., the pre-campaign period, etc.). The identifying criteria may be any criteria suitable for identifying (e.g., characterizing, summarizing, etc.) any aspects of one or more of the payment accounts in the first set.

In several embodiments, the identifying criteria may include, for example, one or more of: an average spend frequency, an average ticket, an average account tenure, a geographic indicator, a total spending amount, etc. These examples provide characteristics indicative of the payment account, which alone, or in combination, may distinguish the consumers' associated payment accounts in the first set from other consumers. In one example, the payment service provider 106 determines the average spend frequency of payment accounts in the first set, which is indicative of how often each participant is completing transactions prior to the start of the campaign. Similarly, in another example, the payment service provider 106 determines how long the average payment accounts have been active, i.e., a tenure for the payment accounts, and the general location of transactions for the first set of payment accounts, etc. Although certain examples are listed herein, it is appreciated that any suitable criteria associated with a payment account and/or indicative of similarities between multiple payment accounts, may be employed as described herein.

Further, as part of determining the identifying criteria, the payment service provider 106 may, in some embodiments, filter and/or reduce the first set of payment accounts to remove certain payment accounts that are inconsistent with a substantial portion of the payment accounts (e.g., a majority, etc.), etc. In at least one example, where one identifying criteria is average spend frequency, a payment service provider 106 may eliminate two payment accounts from the first set, when, for example, 78 of 80 payment accounts in the first set range between an average of 14 transaction per week and 21 transactions per week, and the two eliminated payment accounts average 61 and 2 transaction per week. In this manner, the payment service provider 106 may reduce the risk of certain payment accounts skewing the average ticket size, for example, of the first set of payment accounts.

Once the one or more identifying criteria has been determined for the first set of payment accounts, the payment service provider 106, at 312 selects a second set of payment accounts (different from the first set) based on the one or more identifying criteria of the first set, and based on transaction data for the second set of payment accounts. For example, when the first set of payment accounts includes transactions focused in certain zip codes (e.g., 85% of transactions within three zip codes, etc.), the second set of payment accounts may be selected, by the payment service provider 106, by selecting other payment accounts having transactions focused in those certain zip codes. Similarly, in another example, when the first set of payment accounts substantially consists of payment accounts having an average tenure of 5 years, the second set of payment accounts may be selected, by the payment service provider 106, by selecting other payment accounts having tenures within a predetermined threshold of 5 years, such as, for example, between 4.5-5.5 years. In yet another example, when the first set of payment accounts average 30 transactions per month, the second set may be selected, by the payment service provider 106, by selecting other payment accounts within a predetermined threshold of 30 transactions per month. For example, the payment service provider 106 may select all payment accounts (which are not included in the first set), which individually average between 28 and 34 transactions per month. As a further example, when the average ticket size of the first set of payment accounts is about $15, the second set may be selected, by the payment service provider 106, by selecting other payment accounts within a predetermined threshold of $15, such as, for example, $12-$18.

The predetermined threshold may be selected using any suitable approach, such as, for example, a fixed percentage above and/or below the average value of the first set of payment accounts, a fixed value above and/or below the average value of the first set of payment accounts, a standard deviation of the first set of payment accounts, etc. The predetermined threshold may be selected differently depending on the identifying criteria used.

As should be apparent, any identifying criteria alone, or in combination with one or more identifying criteria, may be used in various examples. And, in those example and others, predetermined thresholds may further provide leniency in the consistency of the first set and second set of payment accounts based on, for example, a desired size of the second set of payment accounts, etc. It should be appreciated that the second set of payment accounts may be determined in a variety of different manners. In particular, any suitable statistical techniques may be employed, based on a variety of different aspects of the transaction data to select a second set of payment accounts that mimics or is otherwise representative of the behavior of the first set of payment accounts during the correlation period (e.g., the pre-campaign period, etc.). Moreover, the second set is selected based on transaction data during the correlation period (e.g., the pre-campaign period, etc.), in an effort to create a control group that did not later participate in the campaign, but which is substantially similar to the first set of payment accounts which did later participate in the campaign.

Referring again to FIG. 3, correlating a second set of payment accounts with the first set of payment accounts permits transaction data for the test group to be compared to transaction data for the control group to evaluate the effectiveness of the campaign. In particular, at 314, the payment service provider 106, and in particular the processor 202, generates a comparison between the first and second sets of payment accounts during the offer period. The comparison may optionally be stored by the processor 202 in memory 204. Because the first and second sets of payment accounts are similar, differences between transactions to the first and second payment accounts during the offer period may be attributed, at least in part, to the campaign. Likewise, the absence of differences during the offer period may be attributed to the effectiveness of the campaign, i.e., ineffectiveness.

Transaction data for each of the sets of payment accounts during the offer period may be compiled and compared to determine any suitable comparison indicator, such as, for example, an amount of spending, frequency of interaction between a consumer holding the payment account and the merchant, tenure, attrition, merchant loyalty, the number of merchant categories, share shift, etc. The comparison provides information on the effectiveness of the campaign between the first and second sets of payment accounts, relative to the attribute being compared. Merchants 102 and/or payment service providers 106 may use the effectiveness comparisons to decide whether to continue, terminate, modify, etc., existing campaigns, offer similar campaigns in the future, expand the reach of campaigns in an attempt to increase participation level, etc.

For example, the sets of payment accounts may be compared to determine whether the first set of payment accounts increased their frequency of transactions with the merchant 102, relative to the second set of payment accounts, and whether the increase was sustained after the offer period. If the first set of payment accounts (i.e., those accounts participating in the promotion campaign) increase transaction frequency during the offering period while the second set of payment accounts (i.e., those not participating) remains constant, the comparison indicates that the campaign was effective in increasing frequency of transactions for those accounts that participated. And further, if the frequency of transactions is maintained for at least a period of time beyond the offer period, the campaign may be understood to have enhanced consumer loyalty to the merchant 102 offering the campaign. Conversely, if both sets of payment accounts remain substantially constant during the offer period, it generally indicates the campaign was ineffective. Similarly, if both sets of payment accounts increased transaction frequency during the offer period, it would indicate the campaign was ineffective and the increase was due to some other factor, because the non-participants increased their transaction frequency by the same amount as the participants.

It may be further determined, in another example, whether the first set increased their total amount of spending, during the offer period, relative to the second set. An increase in total spending to the merchant 102 during the offer period for only the first set further may indicate the campaign was effective in increasing total spending for the participating group. As yet another example, the comparison indicator may include a share shift. In this example, Consumer A spends $100 in groceries per week, of which $30 are spent at Grocery Store XYZ, indicating a 30% wallet share of Consumer A. After the campaign, Consumer A continues to spend $100 in groceries, but $45 of the $100 are spent at Grocery Store XYZ (i.e., a 45% share). Hence, the campaign was effective in shifting the wallet share of Consumer A at Grocery Store XYZ from 30% to 45%.

Further examples of campaign effectiveness that may be determined based on the comparison include, without limitation, whether consumers maintain active payment accounts longer due to the campaign, whether consumers were less likely to close their payment accounts if they participated in the campaign, whether they visited the merchant offering the campaign more often and/or increased the percentage of their overall transactions occurring at the merchant offering the campaign, whether consumers visited a larger variety of types of merchants (e.g., transactions at a greater number of merchant types based on merchant category codes), whether the market share of participating consumer transactions shifted due to the promotional campaign, etc.

Comparisons may be provided to the merchant 102 and/or payment service provider 106 using any suitable format. A report (which may be transmitted to the merchant 102 or other entity involved in the campaign) may be generated providing all or a portion of data values for all transactions for both sets of payment accounts. The comparison information may be summarized in numerical formats, tabular formats, chart format, and/or graphical representations (as described below), etc. Confidence levels and statistical significance of the results may further be calculated based on, for example, the size of the first set of payment accounts, the magnitude of the increase during the offer period, etc. Such confidence intervals and statistical significance may be determined using any suitable statistical methods.

The comparison may include both the correlation period (e.g., the pre-campaign period, etc.) and the offer period, and possibly a period beyond the offer period, or the comparison may only include the offer period. For example, the comparison may include a period beyond the offer period to allow a merchant 102 and/or payment service provider 106 to determine whether the campaign had a lasting impact. If the campaign participating group maintains an increase above the non-participating group even after the offer period, it indicates the campaign was effective in creating a lasting effect. Conversely, if the participating group only increases above the non-participating group during the offer period, but then decreases back to the same level as the non-participating group after the offer period, it indicates the campaign is only effective while it is going on (i.e., during the offer period).

As shown in FIG. 3, the processor 202 optionally, at 316, generates a graphical representation of the first and second payment accounts during the correlation period (e.g., the pre-campaign period, etc.) and the offer period. The graphical representation may provide a visual indication of whether the campaign was effective. For example, if the graph is similar for both sets of payment accounts during the correlation period (e.g., the pre-campaign period, etc.), but the first set increases above the second set during the offer period (or decreases if the desired goal of the campaign was to decrease an attribute), the campaign may be considered as effective. Conversely, if there is no change during the offer period, it may be considered an ineffective campaign. Similarly, if both sets of payment accounts change in the same manner during the offer period, it indicates the change was due to some factor other than the promotional campaign, because the non-participating payment accounts changed in the same way as the participating accounts. Further, if the first set of payment accounts changes only temporarily before returning to the same level as the constant second set, it may indicate the campaign was only temporarily effective, in which case the merchant 102 and/or payment service provider 106 may wish to offer the campaign periodically to improve the campaign's effectiveness.

Figure 4:
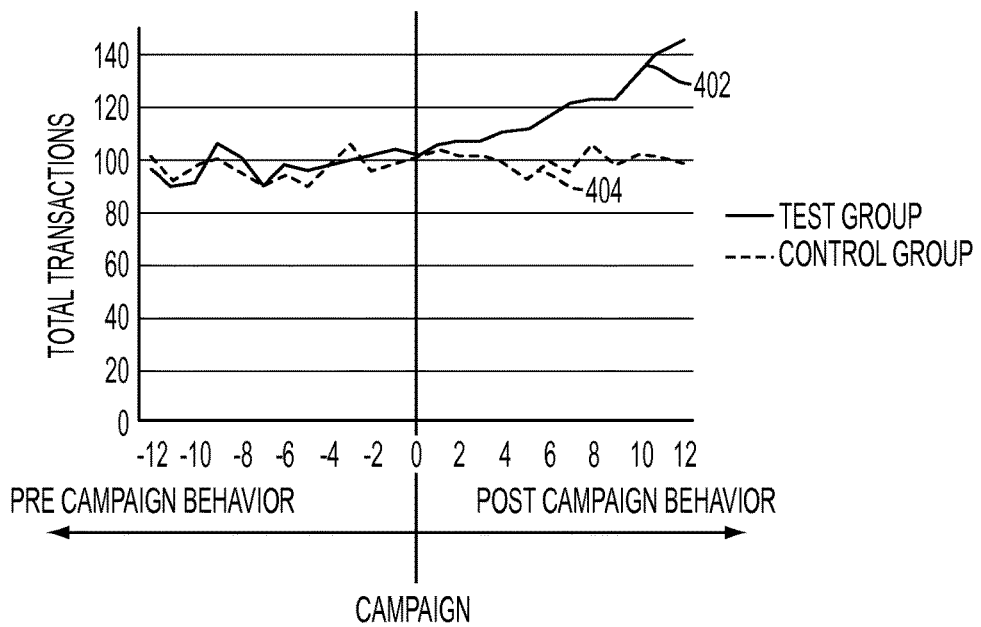
FIG. 4 is an exemplary graphical representation generated according to the method of FIG. 3.

Using the above MyAirWays example, it is possible to compare the sets of payment accounts (i.e., participating vs. non-participating) to determine whether the first set of payment accounts had an increase in MasterCard® payment account transactions after the start of the MyAirWays campaign, relative to the second set of payment accounts. FIG. 4 illustrates an example graphical comparison of the total number of MasterCard® payment account transactions to the first set of payment accounts 402 (Test Group) and second set of payment accounts 404 (Control Group) during a correlation period (e.g., the pre-campaign period, etc.) and an offer period. In the graphical comparison of FIG. 4, the first and second sets of payment accounts have similar average numbers of transactions before the start of the campaign. However, once the campaign begins, the number of transactions increases for the first set of payment accounts 402 that participated in the promotional campaign, while the second set that did not participate 404 remains at the same level. Therefore, it can be considered an effective campaign because it achieved an increase in payment account transactions (e.g., increased the amount of MasterCard® payment account transactions) for consumers participating in the discounted snack price promotion campaign. And, the effectiveness linked to the campaign, because the second set that did not participate showed no increase in transactions after the start of the campaign.

Figure 5:
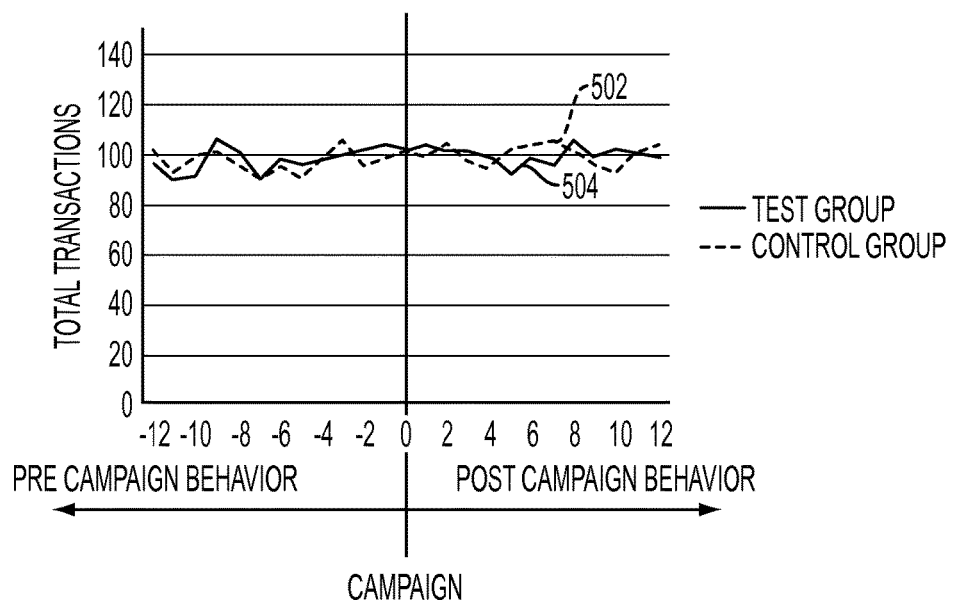
FIG. 5 is another exemplary graphical representation generated according to the method of FIG. 3.

FIG. 5 is similar to the graph of FIG. 4. In this example, however, the total amount of transactions changes only minimally for either set of payment accounts after the start of the campaign (i.e., the first set of payment accounts 502 (Test Group) is similar to the second set of payment accounts 504 (Control Group)), indicating the campaign had little or no effect. If the payment service provider 106 and/or merchant 102 started the campaign in an effort to increase the amount of sales, the graph of FIG. 5 illustrates that no effect occurred. The merchant 102 and/or payment service provider 106 offering the campaign may use this information to decide to, for example, terminate the campaign if it is still active, or choose not to offer the campaign again in the future.

Figure 6:
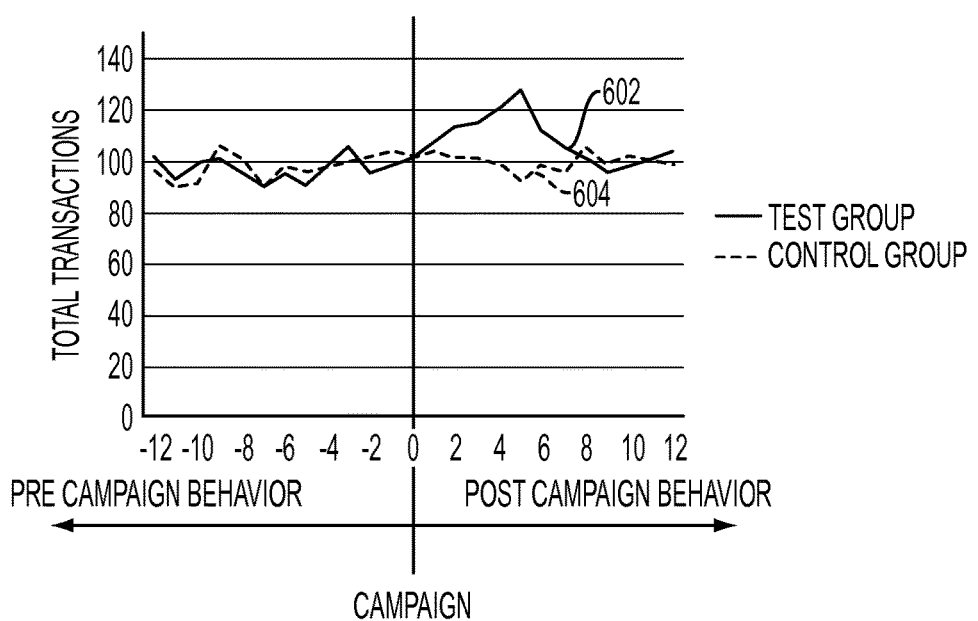
FIG. 6 is yet another exemplary graphical representation generated according to the method of FIG. 3.

FIG. 6 is similar to the graph of FIG. 4, but illustrates only a temporarily effective campaign. In this example, the total amount of transactions increases after the start of the campaign for the first set of payment accounts 602 (Test Group), but then decreases after a time back to its pre-campaign levels (i.e., a level similar to the second set of payment accounts 604 (Control Group)). This indicates that the campaign was effective in achieving an increase in transactions for a short time, but the effectiveness wore off after a temporary period. This type of campaign effectiveness may be referred to as "one and done", where consumers make a purchase at the promotional campaign offer and then return to their original purchasing behavior. If the payment service provider 106 and/or merchant 102 were looking for a longer term increase, or sustained increase during the offer period, the graph of FIG. 6 may indicate the need to alter the campaign, shorten the campaign, or otherwise modify the campaign to replicate the initial reaction of the participating group.

It should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) identifying a promotional campaign, the campaign offered by a merchant during an offer period, the campaign including an offer of a commodity at a predetermined price, (b) compiling, at a computing device, a first set of payment accounts based on each payment account including a transaction to the merchant at the predetermined price within the offer period, (c) compiling, at the computing device, transaction data from the first set of payment accounts for a correlation period, wherein the correlation period is a period other than the offer period, (d) generating at least one identifying criteria associated with the transaction data for the first set of payment accounts for the correlation period, (e) selecting, at the computing device, a second set of payment accounts based on the identifying criteria of the first set of payment accounts and transaction data for the second set of payment accounts during the correlation period, (f) correlating the first set of payment accounts to the second set of payment accounts based on the at least one identifying criteria associated with the transactions to the payment accounts during the correlation period (which is different than the offer period), and (g) generating, at the computing device, a comparison between the transaction data for the first set of payment accounts and the transaction data for the second set of payment accounts during the offer period.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in evaluating effectiveness of a campaign, the method comprising:

identifying a promotional campaign, the campaign offered by a merchant during an offer period, the campaign including an offer of a commodity at a predetermined campaign price;

identifying multiple payment accounts, each of the multiple payment accounts including at least one transaction within the offer period at the merchant, in an amount consistent with a multiple of the campaign price;

compiling, at a computing device, the identified multiple payment accounts into a first set of payment accounts;

compiling, at the computing device, transaction data from the first set of payment accounts for a correlation period, wherein the correlation period is a period different than the offer period;

generating at least one identifying criteria for the first set of payment accounts based on the compiled transaction data for the first set of payment accounts for the correlation period, the at least one identifying criteria including at least one of: an average spend frequency, an average ticket amount, an average account tenure, a geographic indicator, and a total spending amount;

selecting, at the computing device, a second set of payment accounts based on transaction data for each of the second set of payment accounts, within the correlation period, defining an identifying criteria within a predetermined threshold of the corresponding at least one identifying criteria of the first set of payment accounts, the second set of payment accounts being different than the first set of payment accounts; and generating, at the computing device, and storing a comparison report including a comparison between transaction data for the first set of payment accounts and transaction data for the second set of payment accounts during at least the offer period, thereby indicating an effectiveness of the promotional campaign.

2. The method of claim 1, wherein the multiple of the campaign price is greater than one.

3. The method of claim 1, wherein the correlation period does not overlap the offer period, and wherein the correlation period occurs before the offer period.

4. The method of claim 1, wherein the at least one identifying criteria for the first set of payment accounts further includes multiple of: the average spend frequency of the transaction data for the first set of payment accounts, the average ticket amount of the transaction data for the first set of payment accounts, the average account tenure of the first set of payment accounts, the geographic indicator associated with the transaction data for the first set of payment accounts, and the total spending amount for the first set of payment accounts during the correlation period.

5. The method of claim 1, wherein the comparison report includes a graphical comparison indicating a total number of payment account transactions for the first and second sets over the at least the offer period.

6. The method of claim 1, wherein the comparison indicates multiple of: an amount of spending, a frequency of interaction between a consumer holding the payment accounts included in the first or second sets of payment accounts and the merchant, an account tenure, an account attrition, a merchant loyalty, a number of merchant categories, and a share shift.

7. The method of claim 1, wherein the comparison report includes the comparison between the transaction data for the first set of payment accounts and the transaction data for the second set of payment accounts during the offer period and a period beyond the offer period.

8. A system for use in evaluating effectiveness of a campaign, the campaign including an offer for sale of a commodity by a merchant at a predetermined campaign price for an offer period, the system comprising:
 a memory having transaction data for a first set of payment accounts and transaction data for a second set of payment accounts, the payment accounts of the first set being different than the payment accounts of the second set; and
 a processor coupled to the memory, the memory further having instructions executable by the processor to cause the processor to:
  identify the first set of payment accounts based on each payment account including at least one transaction with the merchant during the offer period having an amount consistent with a multiple of the predetermined campaign price;
  correlate the first set of payment accounts with the second set of payment accounts based on identifying criteria for each of the payment accounts in the second set being within a predetermined threshold of at least one identifying criteria of the payment accounts in the first set, the identifying criteria for the payment accounts of both the first and second sets based on transactions to the payment accounts during a correlation period, the correlation period being different than the offer period; and
  generate and store a comparison report including an effectiveness comparison for the campaign between the first set of payment accounts and the second set of payment accounts during at least the offer period, to thereby indicate an effectiveness of the campaign.

9. The system of claim 8, wherein the instructions are executable by the processor, in order to correlate the first and second sets of payment accounts, to cause the processor to generate the at least one identifying criteria for the first set of payment accounts based on transaction data from the correlation period and to select the second set of payment accounts based on the identifying criteria of the payment accounts in the second set being within the predetermined threshold of the at least one identifying criteria of the first set.

10. The system of claim 9, wherein the at least one identifying criteria of the payment accounts in the first set includes at least one of an average spend frequency and an average ticket;
 wherein the multiple of the predetermined campaign price is greater than or equal to one; and
 wherein the amount of the at least one transaction included in each payment account in the first set is equal to the multiple of the predetermined campaign price.

11. The system of claim 9, wherein the at least one identifying criteria of the payment accounts in the first set includes at least one of: an average account tenure for the first set of payment accounts and a total spending for the first set of payment accounts during the correlation period.

12. The system of claim 8, wherein the offer period is at least three months.

13. The system of claim 8, wherein the comparison report includes a graphical representation of the comparison between the first and second sets of payment accounts during the offer period and a period beyond the offer period, the graphical representation indicative of at least one of: an amount of spending, a frequency of interaction between consumers holding the payment accounts and the merchant, a tenure of the payment accounts, an attrition of the payment accounts, a number of merchant categories, and a share shift.

14. The system of claim 8, wherein the comparison of the first set of payment accounts and the second set of payment accounts includes a graphical representation of the first and second sets of payment accounts during the correlation period and the offer period.

15. The system of claim 8, wherein the comparison of the first set of payment accounts and second set of payment accounts includes a numerical representation of the first and second sets of payment accounts with statistically computed confidence levels.

16. A non-transitory computer readable storage media comprising instructions that, when executed by at least one processor, cause the at least one processor to:
 identify a payment promotional campaign, the campaign offered by a merchant during at least an offer period, the campaign including an offer of a commodity at a predetermined campaign price;
 compile a first set of payment accounts based on each payment account including a transaction with the merchant at the predetermined campaign price within the offer period;
 correlate the first set of payment accounts to a second set of payment accounts different than the first set of payment accounts based on at least one identifying criteria associated with transactions to the payment accounts during a correlation period, the correlation period being different than the offer period, wherein the correlation period does not overlap the offer period and wherein the correlation period occurs before the offer period; and
 generate and store an effectives comparison for the campaign between the first set of payment accounts and the second set of payment accounts during the offer period and a period beyond the offer period, to thereby indicate an effectiveness of the payment promotional campaign.

17. The non-transitory computer readable storage media of claim 16, wherein the comparison indicates multiple of: amounts of spending in the payment accounts, tenures of the payment accounts, attrition of the payment accounts, a merchant loyalty, and a number of merchant categories; and
 wherein the at least one identifying criteria includes at least one of an average account tenure, a geographic indicator, and a total spending during the correlation period.

* * * * *